Figure 3:
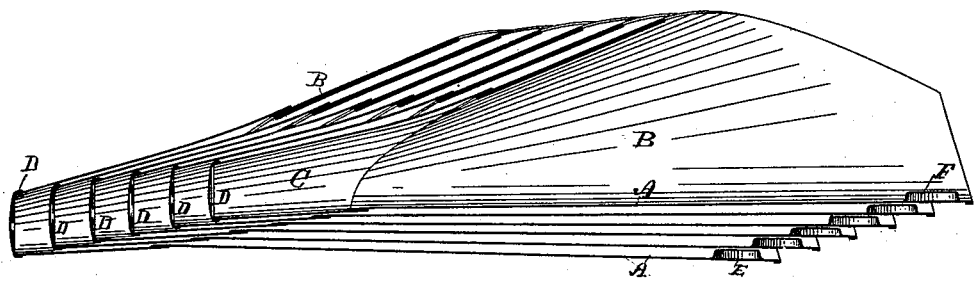

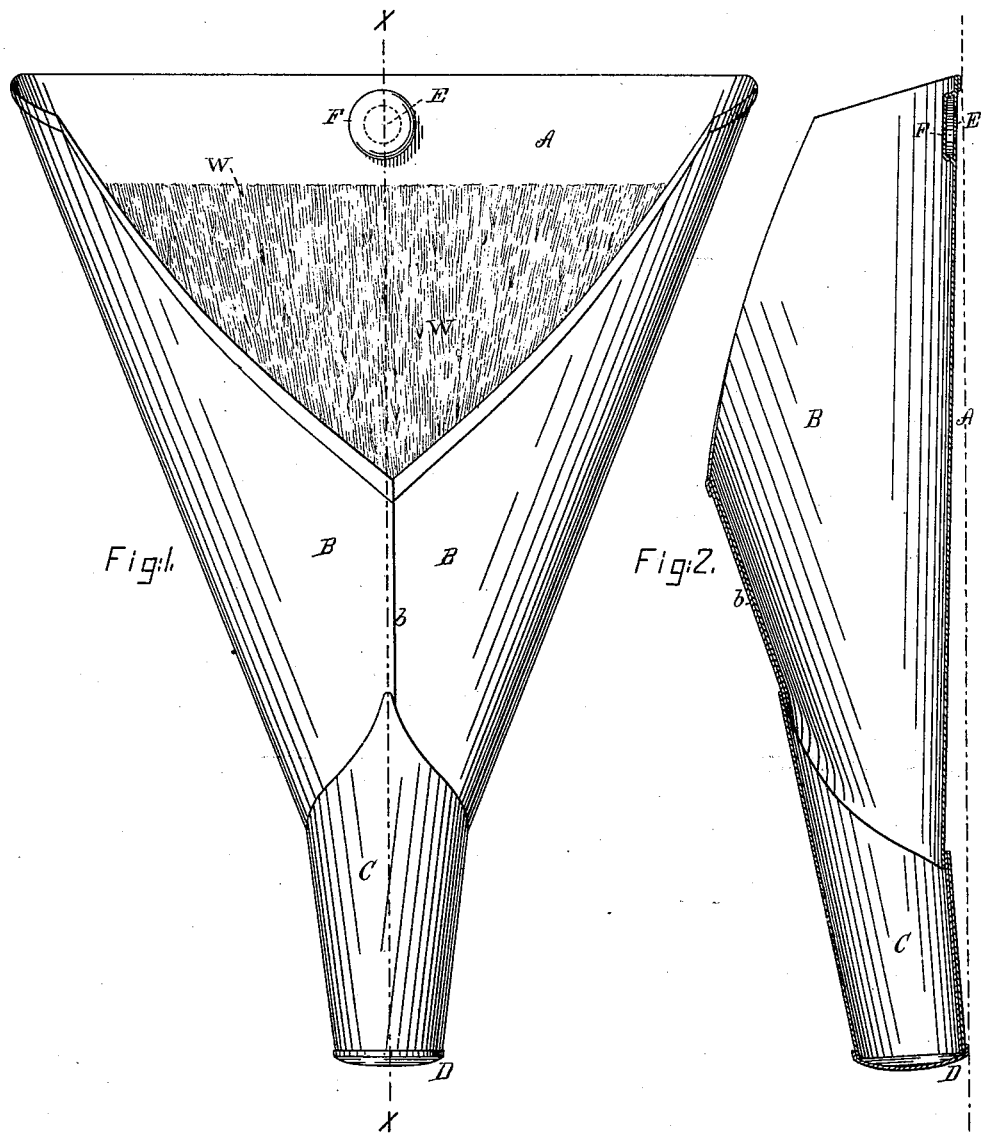

(No Model.) 2 Sheets—Sheet 2.

J. F. HOUGHTON.
Dust Pan and Brush Holder.

No. 233,857. Patented Nov. 2, 1880.

Witnesses.
E. O. Perkins.
C. G. Keyes.

Inventor.
Jesse F. Houghton.
by N. H. Spencer
his attorney

UNITED STATES PATENT OFFICE.

JESSE F. HOUGHTON, OF BOSTON, MASSACHUSETTS.

DUST-PAN AND BRUSH-HOLDER.

SPECIFICATION forming part of Letters Patent No. 233,857, dated November 2, 1880.

Application filed January 24, 1880.

*To all whom it may concern:*

Be it known that I, JESSE F. HOUGHTON, of Boston, Massachusetts, have invented a new, useful, and Improved Dust-Pan and Brush-Holder; and I do hereby declare that the same is fully described in the following specification and illustrated in the accompanying drawings, which represent the best form in which I have contemplated applying my invention.

The object of my improvement is to provide a receptacle for the brush used in gathering up the sweepings, and to so construct the pan that the dust will be concentrated and retained therein, and may be emptied without scattering.

My invention consists in a dust-pan in the form of a funnel flattened on one side, tapering rearwardly, and merging in a handle with which its rear end is provided, all so constructed that the pans and handles will rest snugly one within the other.

It also consists in a covered dust-pan having a hollow handle opening into the interior of the pan and closed at its outer end.

It also consists in such a dust-pan adapted to form a receptacle for the brush, and provided near its flat edge with a covered perforation, by which to suspend it.

In the drawings, Figure 1 is a front view of my improved dust-pan suspended as a brush-holder, and Fig. 2 a vertical longitudinal section on line *x*. Fig. 3 illustrates the manner of nesting a series of pans, which characterizes my invention.

The flat side of the pan, upon the front edge of which the dirt is first received, is designated by the letter A, and the sides and top by the letter B. These parts are preferably shaped over a block to the form shown, and made of a single piece of sheet metal, with the edges brought together and joined in a central seam, *b*.

C is a hollow handle, also formed of one piece of sheet metal, and united to the tapering end of the pan A B so as to leave an opening from the pan to the interior of the part C large enough to receive the handle of the whisk W or other brush employed.

D is a cap, serving to close the outer end of the part C and prevent the escape of dust or dirt through the handle.

The handle is soldered to the small end of the pan so as to project slightly downward, bringing its outer end, D, somewhat below the plane of the bottom A, lifting the rear end and bringing the front edge of the part A into contact with the carpet or floor.

The whole device, body and handle, tapers from front to rear, in order that the pans may nest compactly one within another, to facilitate transportation and storage. The economy of space thus secured is such that I am accustomed to pack one dozen of my dust-pans complete, each twelve inches long, in a box twenty-one inches long, and of the width and height of one pan. I am not aware of any other covered dust-pan having this peculiarity. Fig. 3 represents this feature clearly.

In order to suspend the device so as to form a convenient brush-holder and avoid the necessity of a ring, which would be troublesome whether attached to the under or upper side of the part A, I make a perforation, E, through the bottom, near its front edge or above the center of gravity, and large enough to receive the head of the nail or screw from which it is hung. I cover this aperture by a raised cap, F, for the purpose of preventing the escape of dust or dirt through the hole when the implement is in use as a dust-pan. As a substitute for this I sometimes "strike up" the metal of the bottom at the point named without perforating it.

The operation of the entire device is obvious.

I claim as of my invention—

1. The implement herein described, consisting of the body A B, flattened on one side, and the handle C D, joined thereto at a slight angle downward, all tapering rearwardly, substantially as and for the purposes set forth.

2. A covered dust-pan provided with a hollow handle opening into the interior of the pan and closed at its outer end by the cap D, substantially as and for the purposes set forth.

3. A combined dust-pan and brush-holder provided with a recess or covered perforation in the body of the pan whereby the same may be suspended, substantially as set forth.

JESSE F. HOUGHTON.

Witnesses:
A. H. SPENCER,
SILAS POOLE.